(12) United States Patent
Fukushiro

(10) Patent No.: US 8,577,533 B2
(45) Date of Patent: Nov. 5, 2013

(54) CONTROL APPARATUS FOR HYBRID VEHICLE

(75) Inventor: Eiji Fukushiro, Tokai (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/494,202

(22) Filed: Jun. 12, 2012

(65) Prior Publication Data

US 2012/0323422 A1 Dec. 20, 2012

(30) Foreign Application Priority Data

Jun. 17, 2011 (JP) ................................. 2011-135389

(51) Int. Cl.
*B60W 10/24* (2006.01)

(52) U.S. Cl.
USPC ........................... 701/22; 320/132; 180/65.29

(58) Field of Classification Search
USPC ........................... 701/22; 320/132; 180/65.29
See application file for complete search history.

(56) References Cited

U.S. PATENT DOCUMENTS

| 2008/0091314 | A1* | 4/2008 | Hayashi et al. | 701/22 |
| 2009/0266631 | A1* | 10/2009 | Kikuchi | 180/65.265 |

FOREIGN PATENT DOCUMENTS

| JP | 08-151941 A | 6/1996 |
| JP | 2005-218041 A | 8/2005 |
| JP | 2008-279803 A | 11/2008 |
| JP | 2009-126253 A | 6/2009 |
| JP | 2009-126450 A | 6/2009 |
| JP | 2009-143315 A | 7/2009 |
| JP | 2009-149161 A | 7/2009 |

* cited by examiner

*Primary Examiner* — Mary Cheung
*Assistant Examiner* — Yuen Wong
(74) *Attorney, Agent, or Firm* — Sughrue Mion, PLLC

(57) ABSTRACT

A control apparatus for a hybrid vehicle that includes a battery includes a controller that controls a charge amount of the battery. The controller limits the charge amount of the battery at a time of low vehicle speed even when a state of charge of the battery has fallen. The controller relaxes a limitation on the charge amount when a power driving mode, in which higher priority is given to responsiveness of a driving force than at a time of a normal driving mode, is selected as a driving mode of the hybrid vehicle.

14 Claims, 3 Drawing Sheets

F I G . 1
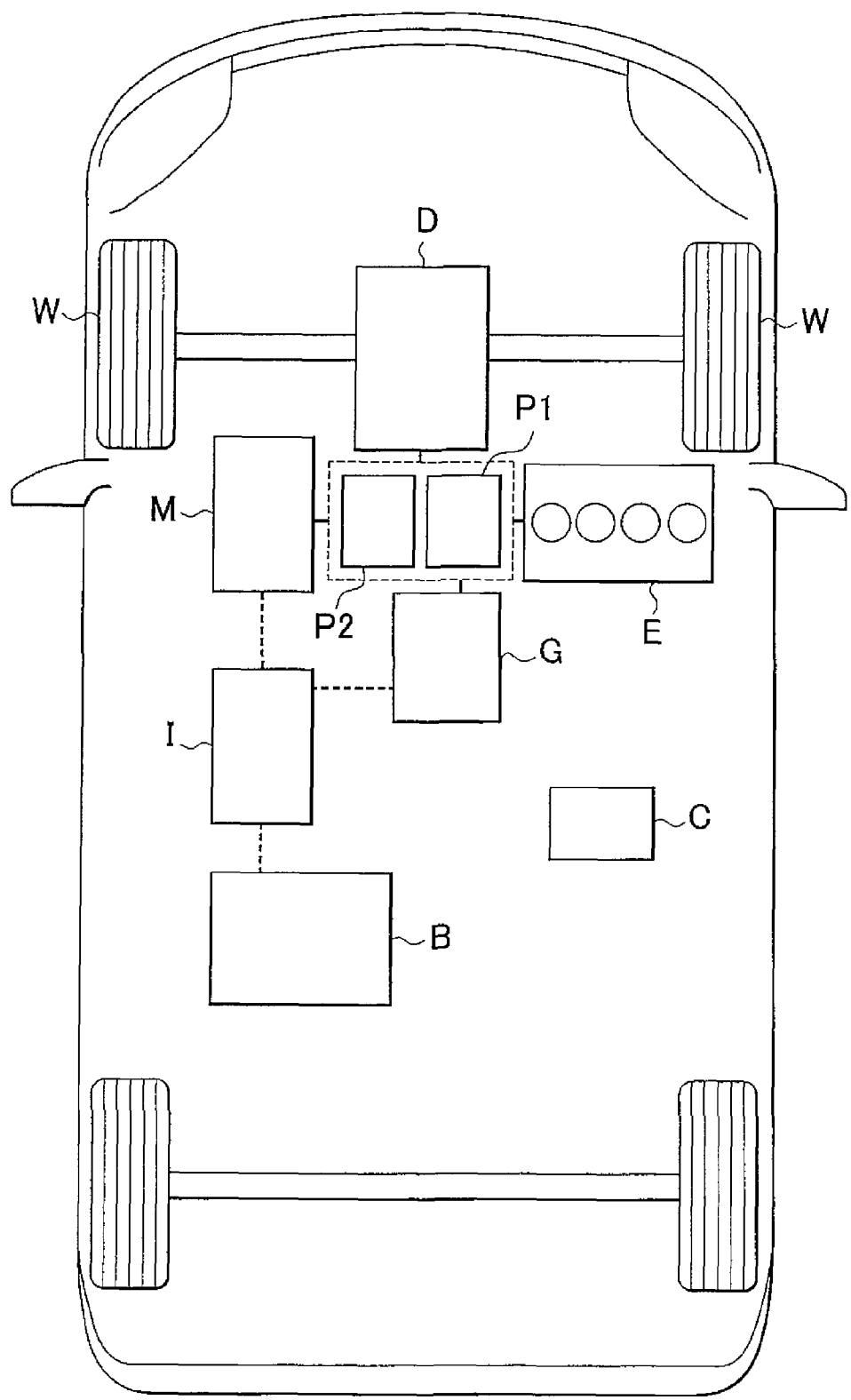

CONTROL APPARATUS FOR HYBRID VEHICLE

INCORPORATION BY REFERENCE

The disclosure of Japanese Patent Application No. 2011-135389 filed on Jun. 17, 2011 including the specification, drawings and abstract is incorporated herein by reference in its entirety.

BACKGROUND OF THE INVENTION

1. Field of the Invention

The invention relates to a control apparatus for a hybrid vehicle that is equipped with two types of drive sources, namely, an engine and a motor.

2. Description of Related Art

Hybrid vehicles that are each equipped with two types of drive sources, namely, an engine and a motor have been put into practical use. Some of such hybrid vehicles are known to make a changeover among a plurality of driving modes. For example, in each of Japanese Patent Application Publication No. 2009-149161 (JP-2009-149161 A), Japanese Patent Application Publication No. 2009-126450 (JP-2009-126450 A), Japanese Patent Application Publication No. 2009-143315 (JP-2009-143315 A), and Japanese Patent Application Publication No. 2009-126253 (JP-2009-126253 A), there is described a hybrid vehicle that can make a changeover among three driving modes, namely, a normal driving mode, a power driving mode, and an economy driving mode.

FIG. 4 shows a relationship between an accelerator depression amount and a required output value in each driving mode in a common hybrid vehicle. As shown in FIG. 4, in the power driving mode, the required output value for the same accelerator depression amount is set larger than in the normal driving mode, and higher priority is given to the responsiveness of a driving force than in the normal driving mode. On the other hand, in the economy driving mode, the required output value for the same accelerator depression amount is set smaller than in the normal driving mode, and higher priority is given to an improvement in fuel economy than in the normal driving mode.

Besides, it is described in each of Japanese Patent Application Publication No. 2009-149161 (JP-2009-149161 A), Japanese Patent Application Publication No. 2009-126450 (JP-2009-126450 A), and Japanese Patent Application Publication No. 2009-143315 (JP-2009-143315 A) that the responsiveness of a driving force is enhanced by enlarging a range where the intermittent operation of an engine is prohibited, at the time of the power driving mode. Further, it is described in Japanese Patent Application Publication No. 2009-126253 (JP-2009-126253 A) that when the power driving mode is selected at a low vehicle speed, the engine is autonomously operated to attempt to restrain the responsiveness to a request for acceleration and the state of charge (the SOC) of a battery from falling.

By the way, in such a hybrid vehicle, when the SOC of the battery falls, the battery is charged with an electric power generated through a power of the engine, so as to attempt to recover the fallen SOC. However, if the engine is operated for electric power generation when the vehicle speed is low, vibrations of an exhaust pipe resulting from vibrations of exhaust gas discharged from the engine cause noise. Thus, in the hybrid vehicle, when the vehicle is stopped or runs at a low vehicle speed, the charge amount of the battery is regulated to restrain the engine from being operated to generate an electric power.

However, when the charge amount is limited, the recovery of the SOC is delayed. Besides, when the SOC is deficient, the driving force cannot be sufficiently supplemented by the motor, and therefore, it may become impossible to ensure high power performance required at the time of the power driving mode.

SUMMARY OF THE INVENTION

The invention provides a control apparatus for a hybrid vehicle that can more reliably ensure a power performance at the time of a power driving mode.

A first aspect of the invention is related to a control apparatus for a hybrid vehicle that includes a battery. The control apparatus for a hybrid vehicle includes a controller that controls a charge amount of the battery. The controller limits the charge amount of the battery at a time of low vehicle speed even when a state of charge of the battery has fallen. The controller relaxes a limitation on the charge amount when a power driving mode, in which higher priority is given to responsiveness of a driving force than at a time of a normal driving mode, is selected as a driving mode of the hybrid vehicle.

In the foregoing configuration, when the power driving mode is selected, the limitation on the charge amount of the battery at the time when the vehicle speed is low is relaxed. Therefore, the recovery of the state of charge is accelerated, and the power performance is restrained from deteriorating due to a deficiency in the state of charge. In consequence, according to the foregoing configuration, the power Performance at the time of the power driving mode can be ensured.

In the above aspect, the controller may lift the limitation on the charge amount when the power driving mode is selected as a driving mode of the hybrid vehicle.

In the foregoing configuration, when the power driving mode is selected, the limitation on the charge amount of the battery at the time when the vehicle speed is low is lifted. Therefore, the recovery of the state of charge is accelerated, and the power performance is restrained from deteriorating due to a deficiency in the state of charge. In consequence, according to the foregoing configuration, the power performance at the time of the power driving mode can be ensured.

In the above aspect, the controller may limit the charge amount of the battery at a time of a fall in the state of charge when the vehicle speed is low, on a condition that the power driving mode be not selected as a driving mode of the hybrid vehicle.

In the above aspect, the controller may set the charge amount of the battery at the time of a fall in the state of charge smaller when the vehicle speed is low than when the vehicle speed is high, on a condition that the power driving mode be not selected as a driving mode of the hybrid vehicle.

A second aspect of the invention is related to a control apparatus for a hybrid vehicle that includes a battery. The control apparatus for a hybrid vehicle includes a controller that controls a charge amount of the battery. The controller limits the charge amount of the battery at a time of a fall in a state of charge when a vehicle speed is low, on a condition that a power driving mode, in which higher priority is given to responsiveness of a driving force than at a time of a normal driving mode, be not selected as a driving mode of the hybrid vehicle.

In the foregoing configuration, when the power driving mode is selected, the charge amount of the battery is not limited at the time of low vehicle speed. Thus, the recovery of the state of charge is accelerated, and the power performance is restrained from deteriorating due to a deficiency in the state of charge. In consequence, according to the foregoing configuration, the power performance at the time of the power driving mode can be ensured.

A third aspect of the invention is related to a control apparatus for a hybrid vehicle that includes an engine. The control apparatus for a hybrid vehicle includes a controller that controls operation of the engine in accordance with a driving state of the hybrid vehicle. The controller limits the operation of the engine to generate an electric power when a vehicle speed is low. The controller relaxes a limitation on the operation of the engine when a power driving mode, in which higher priority is given to responsiveness of a driving force than at a time of a normal driving mode, is selected as a driving mode of the hybrid vehicle.

In the foregoing configuration, when the power driving mode is selected, the limitation on the operation of the engine for electric power generation at the time of low vehicle speed is relaxed. Therefore, the recovery of the state of charge is accelerated, and the power performance is restrained from deteriorating due to a deficiency in the state of charge. In consequence, according to the foregoing configuration, the power performance at the time of the power driving mode can be ensured.

In the above aspect, the controller may lift the limitation on the operation of the engine when the power driving mode is selected as a driving mode of the hybrid vehicle.

In the foregoing configuration, when the power driving mode is selected, the limitation on the operation of the engine for electric power generation at the time of low vehicle speed is lifted. Therefore, the recovery of the state of charge is accelerated, and the power performance is restrained from deteriorating due to a deficiency in the state of charge. In consequence, according to the foregoing configuration, the power performance at the time of the power driving mode can be ensured.

In the above aspect, the controller may limit the operation of the engine for electric power generation when the vehicle speed is low, on a condition that the power driving mode not be selected as a driving mode of the hybrid vehicle.

A fourth aspect of the invention is related to a control apparatus for a hybrid vehicle that includes an engine. The control apparatus for a hybrid vehicle includes a controller that controls operation of the engine in accordance with a driving state of the hybrid vehicle. The controller limits the operation of the engine for electric power generation when a vehicle speed is low, on a condition that a power driving mode, in which higher priority is given to responsiveness of a driving force than at a time of a normal driving mode, be not selected as a driving mode of the hybrid vehicle.

In the foregoing configuration, when the power driving mode is selected, the operation of the engine for electric power generation is not limited at the time of low vehicle speed. Therefore, the recovery of the state of charge is accelerated, and the power performance is restrained from deteriorating due to a deficiency in the state of charge. In consequence, according to the foregoing configuration, the power performance at the time of the power driving mode can be ensured.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 1 is a schematic view schematically showing a configuration of a hybrid vehicle to which one embodiment of the invention is applied;

DETAILED DESCRIPTION OF EMBODIMENT

Figure 2:
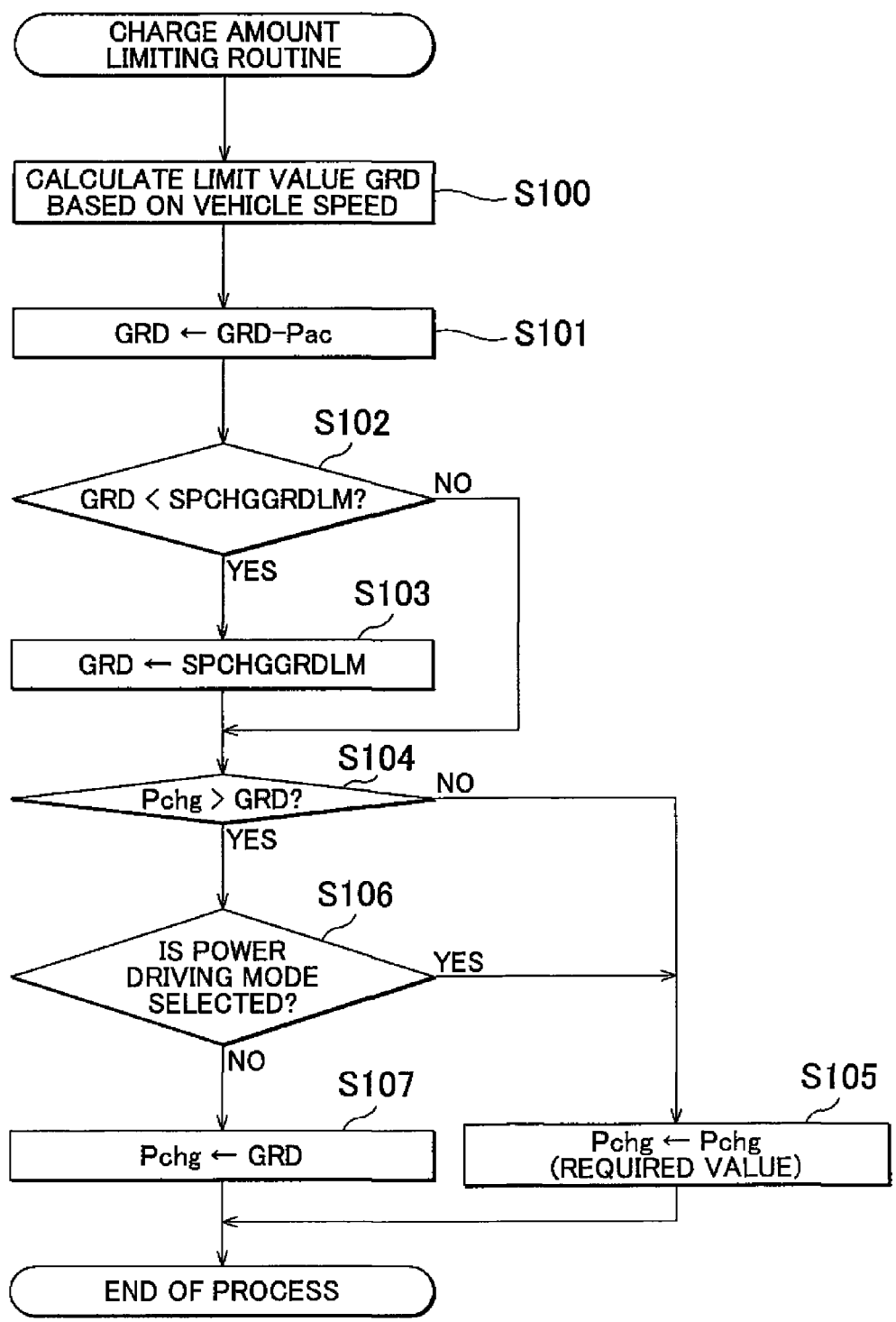
FIG. 2 is a flowchart showing a process procedure of a charge amount limiting routine adopted in the embodiment of the invention.
Figure 3:
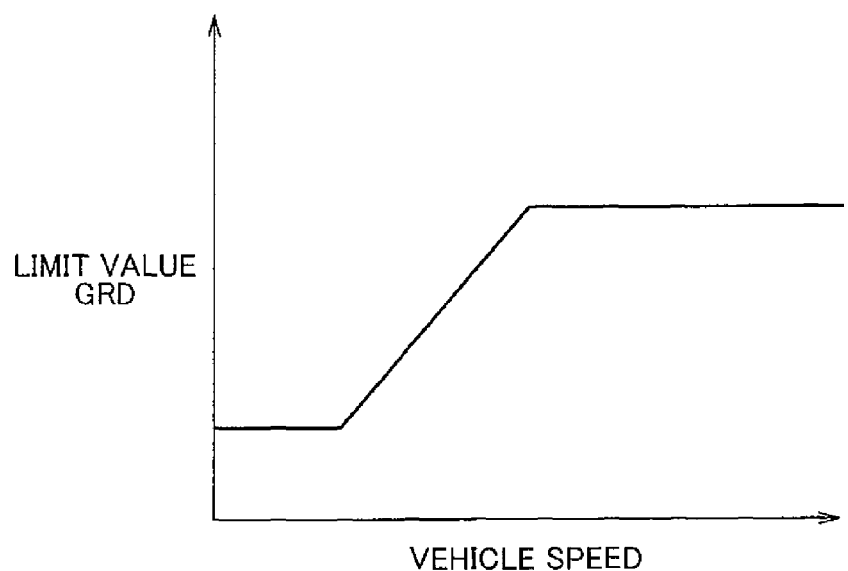
FIG. 3 is a graph showing a relationship between a vehicle speed and a limit value GRD in a map for calculating a limit value, which is applied to the embodiment of the invention.
Figure 4:
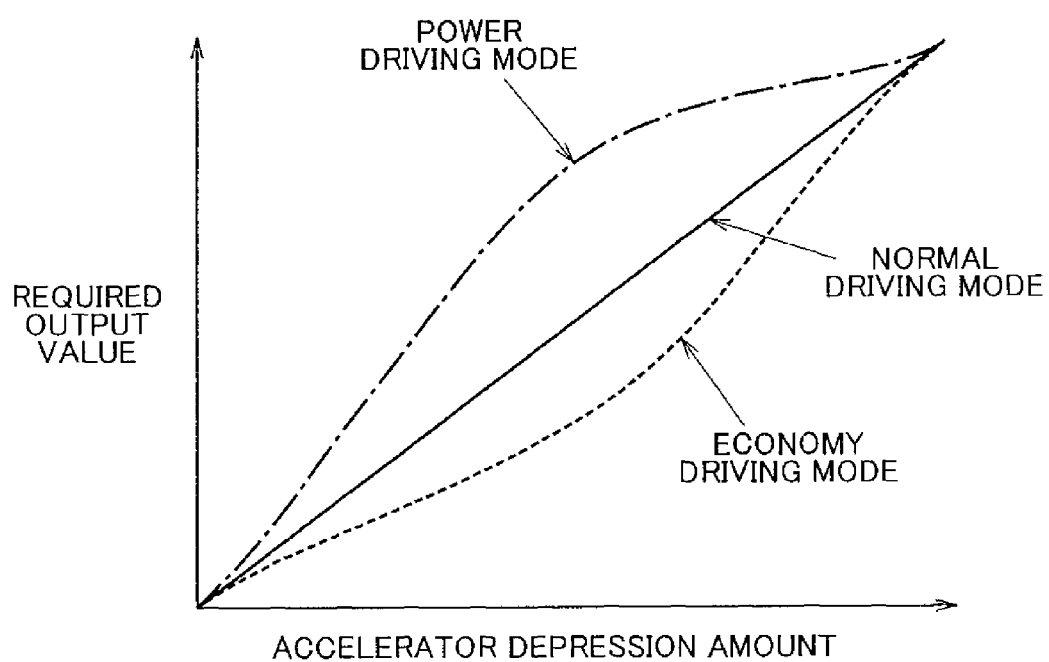
FIG. 4 is a graph showing a relationship between an accelerator depression amount and a required output value in each driving mode in a common hybrid vehicle.

One embodiment as a concrete form of a control apparatus for a hybrid vehicle of the invention will be described hereinafter in detail with reference to FIGS. 1 to 3. First of all, the configuration of the hybrid vehicle to which the control apparatus according to this embodiment of the invention is applied will be described with reference to FIG. 1.

As shown in FIG. 1, this hybrid vehicle is equipped with three drive sources, namely, an engine E, a first generator motor G that generates an electric power through an output of the engine and serves as a starter when the engine is started, and a second generator motor M that supplements an output of the engine and provides a driving force when the vehicle starts moving. The engine E, the first generator motor G and the second generator motor M are drivingly coupled to a power split mechanism that is composed of two planetary gears, namely, a power split planetary gear P1 and a reduction planetary gear P2. Besides, the power split mechanism is connected to driving wheels W via a reducer D.

On the other hand, the first generator motor G and the second generator motor M are connected to a battery B via an inverter I that converts a high-voltage DC current and a three-phase AC current into each other. The battery B supplies an electric power to the second generator motor M, and stores an electric power generated by the first generator motor G, or an electric power generated by the second generator motor M at the time of regeneration.

The hybrid vehicle as described above is controlled by a controller C. The controller C calculates outputs of the engine E and the second generator motor M corresponding to an operation state, on the basis of signals indicating an accelerator pedal depression stroke, a shift position and the like, and controls a driving force. Further, the controller C also monitors a state of the battery B such as an SOC value, a voltage, a current value, a temperature and the like.

It should be noted that this hybrid vehicle is designed such that the driving mode of the vehicle can be changed over among three modes, namely, a power driving mode, a normal driving mode, and an economy driving mode. In the power driving mode, the required output value for the same accelerator pedal depression stroke is set larger than in the normal driving mode, so that higher priority is given to the responsiveness of a driving force than in the normal driving mode. On the other hand, in the economy driving mode, the required output value for the same accelerator pedal depression stroke is set smaller than in the normal driving mode, so that higher priority is given to an improvement in fuel economy than in the normal driving mode.

In this embodiment of the invention, the controller C controls the charge amount of the battery B as part of the control of the hybrid vehicle. A charge amount Pchg of the battery B is calculated by limiting a required value of the charge amount Pchg, which is determined from an SOC value or the like, in accordance with a vehicle speed. A limit value GRD of the charge amount Pchg of the battery B based on the vehicle speed is calculated through a process of a charge amount limiting routine shown in FIG. 2. It should be noted that the process of the routine is repeatedly performed on a predetermined control cycle by the controller C.

Now, when this routine is started, the controller C calculates the limit value GRD corresponding to the vehicle speed first in step S100. The limit value GRD is calculated referring to a map stored in the controller C. As shown in FIG. 3, the limit value GRD is set smaller when the vehicle speed is low than when the vehicle speed is high. Subsequently in step S101, the controller C updates, as the limit value GRD, a value obtained by subtracting an electric power consumption Pac of an air-conditioning system from the value of the limit value GRD calculated in S100.

Then in step S102, the controller C confirms whether or not the limit value GRD is smaller than a prescribed minimum charge amount guaranty value SPCHGGRDLM. When the limit value GRD is smaller than the prescribed minimum charge amount guaranty value SPCHGGRDLM (S102: YES), the controller C sets the value of the limit value GRD as the minimum charge amount guaranty value SPCHGGRDLM in step S103.

On the other hand, when the limit value GRD is equal to or larger than the prescribed minimum charge amount guaranty value SPCHGGRDLM (S102: NO), the process skips step S103 and proceeds to step S104, which will be described later.

In step S104, the controller C confirms whether or not the required value of the charge amount Pchg is larger than the limit value GRD. It should be noted herein that when the required value of the charge amount Pchg is not larger than the limit value GRD (S104: NO), the controller C directly sets the required value as the charge amount Pchg in step S105, and terminates the current process of this routine.

On the other hand, when the required value of the charge amount Pchg is larger than the limit value GRD (S104: YES), the controller C confirms in step S106 whether or not the power driving mode is selected as the driving mode of the hybrid vehicle. It should be noted herein that when the power driving mode is not selected (S106: NO), the controller C sets the limit value GRD as the value of the charge amount Pchg in step S107, and terminates the current process of this routine. On the other hand, when the power driving mode is selected (S106: YES), the controller C directly sets the required value as the charge amount Pchg in step S105, and terminates the current process of this routine.

Subsequently, the operation of this embodiment of the invention as described above will be described. In this embodiment of the invention, the limit value GRD is set to a small value when the vehicle speed is low, and the charge amount Pchg is so calculated as not to exceed the limit value GRD when a driving mode other than the power driving mode is selected. Accordingly, when the vehicle speed is low with a driving mode other than the power driving mode selected, the charge amount of the battery B at the time of a fall in the state of charge is limited, and the operation of the engine E for electric power generation is limited.

On the other hand, in this embodiment of the invention, even if the required value of the charge amount Pchg exceeds the limit value GRD when the power driving mode is selected, the required value is directly set as the value of the charge amount Pchg. Accordingly, when the power driving mode is selected, the limitation on the charge amount of the battery B at the time of low vehicle speed is lifted. The present invention has an advantage when the limitation on the charge amount of the battery B at the time of low vehicle speed is relaxed. Therefore, relaxing the limitation has a broader meaning than lifting the limitation.

In this embodiment of the invention, when the power driving mode is selected, the limitation on the charge amount of the battery B at the time of low vehicle speed, namely, the limitation on the operation of the engine E for electric power generation is lifted. Thus, when the power driving mode is selected, the recovery of the SOC is accelerated, and the power performance is restrained from deteriorating due to a deficiency in the SOC. In consequence, according to this embodiment of the invention, the power performance at the time of the power driving mode can be more reliably ensured.

It should be noted that although the limitation on the charge amount of the battery B at the time of low vehicle speed, namely, the limitation on the operation of the engine E for electric power generation is lifted when the power driving mode is selected in the foregoing embodiment of the invention, the power performance at the time of the power driving mode can be more reliably ensured even when the limitation is just relaxed. That is, relaxing the limitation on the operation of the engine E has a broader meaning than lifting the limitation on the operation of the engine E. The recovery of the SOC of the battery B at the time when the power driving mode is selected can be accelerated, and the power performance can be more reliably ensured, if the limit value GRD is set larger when the power driving mode is selected than when a driving mode other than the power driving mode is selected.

What is claimed is:

1. A control apparatus for a hybrid vehicle that includes a battery, comprising:
   a controller that controls a charge amount of the battery,
   wherein the controller limits the charge amount of the battery at a time of low vehicle speed even when a state of charge of the battery has fallen, and
   wherein the controller relaxes a limitation on the charge amount when a power driving mode, in which higher priority is given to responsiveness of a driving force than at a time of a normal driving mode, is selected as a driving mode of the hybrid vehicle.

2. The control apparatus for the hybrid vehicle according to claim 1, wherein the controller lifts the limitation on the charge amount when the power driving mode is selected as a driving mode of the hybrid vehicle.

3. The control apparatus for the hybrid vehicle according to claim 1, wherein the controller limits the charge amount of the battery at a time of a fall in the state of charge when the vehicle speed is low, on a condition that the power driving mode is not selected as a driving mode of the hybrid vehicle.

4. The control apparatus for the hybrid vehicle according to claim 3, wherein the controller sets the charge amount of the battery smaller at the time of a fall in the state of charge when the vehicle speed is low than when the vehicle speed is high, on a condition that the power driving mode is not selected as a driving mode of the hybrid vehicle.

5. A control apparatus for a hybrid vehicle that includes a battery, comprising:
   a controller that controls a charge amount of the battery,
   wherein the controller limits the charge amount of the battery at a time of a fall in a state of charge when a vehicle speed is low, on a condition that a power driving mode, in which higher priority is given to responsiveness of a driving force than at a time of a normal driving mode, is not selected as a driving mode of the hybrid vehicle.

6. A control apparatus for a hybrid vehicle that includes an engine, comprising:

a controller that controls operation of the engine in accordance with a driving state of the hybrid vehicle, wherein the controller limits the operation of the engine to generate an electric power when a vehicle speed is low, and wherein the controller relaxes a limitation on the operation of the engine when a power driving mode, in which higher priority is given to responsiveness of a driving force than at a time of a normal driving mode, is selected as a driving mode of the hybrid vehicle.

7. The control apparatus for the hybrid vehicle according to claim 6, wherein the controller lifts the limitation on the operation of the engine when the power driving mode is selected as a driving mode of the hybrid vehicle.

8. The control apparatus for the hybrid vehicle according to claim 6, wherein the controller limits the operation of the engine for electric power generation when the vehicle speed is low, on a condition that the power driving mode is not selected as a driving mode of the hybrid vehicle.

9. A control apparatus for a hybrid vehicle that includes an engine, comprising:

a controller that controls operation of the engine in accordance with a driving state of the hybrid vehicle, wherein the controller limits the operation of the engine for electric power generation when a vehicle speed is low, on a condition that a power driving mode, in which higher priority is given to responsiveness of a driving force than at a time of a normal driving mode, is not selected as a driving mode of the hybrid vehicle.

10. A control apparatus for a hybrid vehicle that includes a battery, comprising:

a controller that controls a charge amount of the battery during a power driving mode, in which higher priority is given to responsiveness of a driving force than a normal driving mode;

wherein the controller is operable for limiting the charge amount of the battery even when a state of charge of the battery has fallen, and wherein the controller is operable for relaxing a limitation on the charge amount when the power driving mode is selected as a driving mode of the hybrid vehicle.

11. The control apparatus for the hybrid vehicle according to claim 10, wherein the controller is operable for lifting the limitation on the charge amount when the power driving mode is selected as the driving mode of the hybrid vehicle.

12. The control apparatus for the hybrid vehicle according to claim 10, wherein the controller is operable for limiting the charge amount of the battery at a time of a fall in the state of charge when the power driving mode is not selected as the driving mode of the hybrid vehicle.

13. A method of controlling a hybrid vehicle that includes a battery, and a controller that controls a charge amount of the battery during a power driving mode in which higher priority is given to responsiveness of a driving force than a normal driving mode; the method comprising:

limiting the charge amount of the battery even when a state of charge of the battery has fallen, and relaxing a limitation on the charge amount when the power driving mode is selected as a driving mode of the hybrid vehicle.

14. A method of controlling a hybrid vehicle that includes a battery, and a controller that controls a charge amount of the battery during a power driving mode, in which higher priority is given to responsiveness of a driving force than a normal driving mode; the method comprising:

limiting the charge amount of the battery even when a state of charge of the battery has fallen; and lifting a limitation on the charge amount when the power driving mode is selected as a driving mode of the hybrid vehicle.

* * * * *